(12) United States Patent
Evans et al.

(10) Patent No.: US 12,394,064 B2
(45) Date of Patent: Aug. 19, 2025

(54) TRACKING OBJECTS USING SENSOR DATA SEGMENTATIONS AND/OR REPRESENTATIONS

(71) Applicant: Zoox, Inc., Foster City, CA (US)

(72) Inventors: Bryce A. Evans, San Mateo, CA (US);
Derek Xiang Ma, San Carlos, CA (US);
Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 255 days.

(21) Appl. No.: 17/549,756

(22) Filed: Dec. 13, 2021

(65) Prior Publication Data
US 2022/0101020 A1 Mar. 31, 2022

Related U.S. Application Data

(63) Continuation of application No. 16/235,862, filed on Dec. 28, 2018, now Pat. No. 11,200,429.

(51) Int. Cl.
*G06T 7/246* (2017.01)
*G01S 17/58* (2006.01)
(Continued)

(52) U.S. Cl.
CPC .............. *G06T 7/246* (2017.01); *G01S 17/58* (2013.01); *G01S 17/89* (2013.01); *G01S 17/931* (2020.01);
(Continued)

(58) Field of Classification Search
CPC ........... G06T 7/20; G06T 7/246; G06T 7/248; G06T 7/251; G06T 7/285; G06T 7/10; G06T 7/11; G06T 7/174; G06T 7/215; G06T 7/223; G06T 7/70; G06T 7/73; G06T 7/74; G06T 7/75; G06T 2207/20021; G06T 2207/20081; G06T 2207/20084; G06T 2207/20132; G06T 2207/30181; G06T 2207/30196; G06T 2207/30212;
(Continued)

(56) References Cited

U.S. PATENT DOCUMENTS

| 2017/0008521 A1 | 1/2017 | Braunstein et al. |
| 2018/0032082 A1 | 2/2018 | Shalev-Shwartz et al. |

(Continued)

OTHER PUBLICATIONS

Kim M, Alletto S, Rigazio L. Similarity mapping with enhanced siamese network for multi-object tracking. arXiv preprint arXiv: 1609.09156. Sep. 28, 2016. (Year: 2016).*
(Continued)

*Primary Examiner* — Ming Y Hon
(74) *Attorney, Agent, or Firm* — Lee & Hayes, P.C.

(57) ABSTRACT

Techniques are disclosed for tracking objects in sensor data, such as multiple images or multiple LIDAR clouds. The techniques may include comparing segmentations of sensor data such as by, for example, determining a similarity of a first segmentation of first sensor data and a second segmentation of second sensor data. Comparing the similarity may comprise determining a first embedding associated with the first segmentation and a second embedding associated with the second segmentation and determining a distance between the first embedding and the second embedding. The techniques may improve the accuracy and/or safety of systems integrating the techniques discussed herein.

20 Claims, 6 Drawing Sheets

(51) Int. Cl.
  *G01S 17/89* (2020.01)
  *G01S 17/931* (2020.01)
  *G05D 1/00* (2006.01)
  *G06N 3/044* (2023.01)
  *G06N 3/08* (2023.01)
  *G06N 20/00* (2019.01)
  *G06T 7/174* (2017.01)
  *G06V 10/20* (2022.01)
  *G06V 10/26* (2022.01)
  *G06V 10/62* (2022.01)
  *G06V 10/82* (2022.01)
  *G06V 20/56* (2022.01)
  *G06V 20/58* (2022.01)

(52) U.S. Cl.
  CPC ............ *G05D 1/0088* (2013.01); *G06N 3/044* (2023.01); *G06N 3/08* (2013.01); *G06N 20/00* (2019.01); *G06T 7/174* (2017.01); *G06V 10/255* (2022.01); *G06V 10/26* (2022.01); *G06V 10/62* (2022.01); *G06V 10/82* (2022.01); *G06V 20/56* (2022.01); *G06V 20/58* (2022.01); *G06V 20/584* (2022.01); *G06T 2207/20081* (2013.01); *G06T 2207/20084* (2013.01); *G06T 2207/30236* (2013.01); *G06T 2207/30241* (2013.01); *G06T 2207/30261* (2013.01)

(58) Field of Classification Search
  CPC ......... G06T 2207/303236; G06T 2207/30241; G06T 2207/30248; G06T 2207/30252; G06T 2207/3256; G06T 2207/30261; G06T 2207/30264; G06N 3/00; G06N 3/02; G06N 3/04; G06N 3/044; G06N 3/045; G06N 3/0464; G06N 3/08; G06N 3/088; G06N 3/0895; G06N 3/09; G06N 3/091; G06N 20/00; G06N 20/10; G06N 20/20; G01S 17/50; G01S 17/58; G01S 17/88; G01S 17/89; G01S 17/894; G01S 17/93; G01S 17/931; G01S 17/933; G05D 1/00; G05D 1/0088; G05D 1/02; G05D 1/021; G05D 1/0212; G05D 1/0214; G05D 1/0217; G05D 1/0219; G05D 1/0221; G05D 1/0223; G05D 1/0225; G05D 1/0231; G05D 1/0246; G05D 1/0248; G05D 1/0251; G05D 1/0253; G05D 1/10; G06V 10/255; G06V 10/26; G06V 10/40; G06V 10/44443; G06V 10/446; G06V 10/449; G06V 10/451; G06V 10/454; G06V 10/457; G06V 10/50; G06V 20/40; G06V 20/46; G06V 20/48; G06V 20/52; G06V 20/54; G06V 20/56; G06V 20/58; G06V 20/252; G06V 20/584; G06V 20/588

See application file for complete search history.

(56) References Cited

U.S. PATENT DOCUMENTS

| | | | |
|---|---|---|---|
| 2018/0129906 A1* | 5/2018 | Habibian | G06V 10/764 |
| 2018/0129934 A1* | 5/2018 | Tao | G06N 3/084 |
| 2018/0260613 A1 | 9/2018 | Gao | |
| 2019/0073564 A1 | 3/2019 | Saliou | |
| 2019/0090786 A1* | 3/2019 | Kim | G06N 3/08 |
| 2019/0102630 A1* | 4/2019 | Bamba | G06T 11/206 |
| 2019/0304105 A1 | 10/2019 | Gao et al. | |
| 2019/0332935 A1* | 10/2019 | Sanchez Bermudez | G06T 7/248 |
| 2019/0346557 A1 | 11/2019 | Baba | |
| 2020/0051252 A1 | 2/2020 | Brown et al. | |
| 2020/0051254 A1* | 2/2020 | Habibian | G06T 7/75 |
| 2020/0184233 A1 | 6/2020 | Berberian et al. | |
| 2020/0257975 A1 | 8/2020 | Chang et al. | |
| 2020/0302180 A1* | 9/2020 | Zhang | G06V 20/48 |
| 2021/0158059 A1 | 5/2021 | Kanzawa | |

OTHER PUBLICATIONS

Zheng L, Shen L, Tian L, Wang S, Wang J, Tian Q. Scalable person re-identification: A benchmark. Proceedings of the IEEE international conference on computer vision, Feb. 2015, (pp. 1116-1124). (Year: 2015).*

Non Final Office Action dated Sep. 9, 2020 for U.S. Appl. No. 16/235,862, "Tracking Objects Using Sensor Data Segmentations and/or Representations", Evans, 24 pages.

* cited by examiner

TRACKING OBJECTS USING SENSOR DATA SEGMENTATIONS AND/OR REPRESENTATIONS

RELATED APPLICATIONS

This Application claims priority to U.S. Pat. No. 11,200,429, filed Dec. 28, 2018, which is incorporated in its entirety herein by reference.

This Application claims priority to U.S. patent application Ser. No. 16/235,862, filed Dec. 28, 2018, which is incorporated herein by reference.

BACKGROUND

Computer vision is used in numerous applications, such as operating autonomous vehicles, identifying individuals for security purposes, etc. Computer vision techniques may include building software components that identify salient portions from an image, representing the salient portions of the image to the computer in a form that the computer can use to conduct further operations, and/or tracking objects. However, current tracking systems may "lose" track of an object in a variety of situations. In one example, an existing tracking system may lose track of an object by suddenly misclassifying the object because the object rotated in an unfamiliar way making it appear different. Or, current tracking systems may "fixate" on something other than an object. For example, the tracking system may initially track an object of interest, like a human, only to stop tracking the human and start to track motion of a tree that the human happened to pass by. Such losses of tracking are problematic for various applications such as operating autonomous vehicles.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
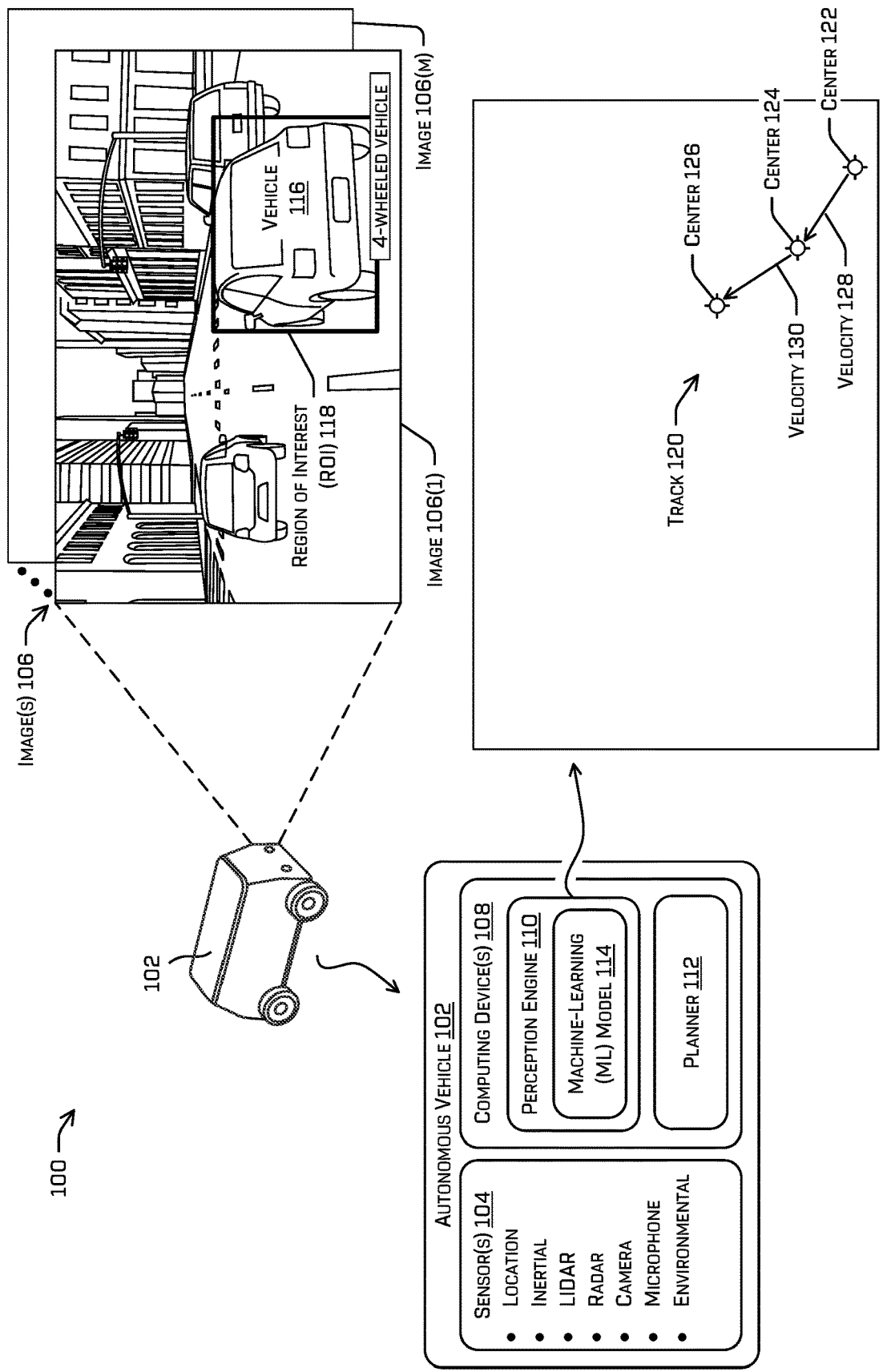
FIG. 1 illustrates an example scenario depicting an autonomous vehicle tracking an object.

The techniques discussed herein may improve computer vision by, for example, increasing the accuracy of object tracking. This may result in continuously tracking the correct object without starting to track a different object (e.g., without losing track of an object) or getting "stuck" on something other than an object (e.g., a waving tree, other background objects), continuing to track the object when the object rotates, translates, changes size, or otherwise changes appearance in the image, regardless in changes in background, occlusions, and number of additional objects represented in sensor data. In general, tracking an object may comprise determining whether an object that appears in a first image, captured at a first time, also appears in a second image, captured at a second time later than the first time. In some examples, tracking information may additionally include, for example, object velocities (either in pixel coordinates and/or environmental coordinates), historical object velocities (e.g., one or more previously determined object velocities), object accelerations, historical object accelerations, object extents, and the like. For example, where a vehicle appears in a first image, it may be helpful to know whether a vehicle appearing in a second image received at some time after the first image is the same vehicle as in the first image, or a newly perceived vehicle. Tracking objects may be used to predict behavior of the object, to ensure decisions made regarding operation of a device take into account a track of an object, etc. Moreover, tracking an object may reduce redundant computation related to an object such as, for example, re-classifying an object, re-obtaining data related to an object (e.g., downloading additional information pertinent to an object), re-calculating an acceleration and/or other characteristics, etc.

The techniques discussed herein relate to detecting and tracking objects through multiple images and/or other sensor data. To determine whether two or more images contain representations of a same object, the techniques may comprise segmenting data representative of an object (e.g., pixels and/or other discrete portions of sensor data that represents an object), and comparing a first segmentation (e.g., an instance segmentation) for a first image to a second segmentation for a second image. If the two segmentations are sufficiently similar, the techniques may include indicating that the first segmentation and/or the second segmentation are associated with a same object and/or associating the first segmentation and/or the second segmentation with a same track. In an additional or alternate example, to facilitate comparing similarity of the first segmentation and the second segmentation, the techniques may comprise determining a first embedding based on, or otherwise associated with, the first segmentation and a second embedding based on, or otherwise associated with, the second embedding. In such an example, the techniques may comprise determining a distance between the first embedding and the second embedding to determine a similarity between the first segmentation and the second segmentation (e.g., a machine-learning (ML) model may be trained to determining embeddings such that the distance is indicative similarity).

In some examples, tracking an object may comprise receiving first data (such as a first image, first light detection and ranging (LIDAR) data, first RADAR data, etc.) captured by a sensor at a first capture time and second data (e.g., a second image, second LIDAR data, second RADAR data, etc.) captured by the sensor at a second capture time. For example, the first capture time may precede or otherwise be prior to the second capture time. Note that, in some examples, the sensor may comprise different sensors (image sensors, LIDAR sensors, RADAR sensors, time-of-flight sensors, depth cameras, stereo cameras, and the like). The techniques may comprise providing the first data to an ML model and receiving, from the ML model, a first region of interest (ROI) associated with the object represented in the first data. For example, an ROI may be any form of identifying what the ML model identifies to be the existence of an object in the image. In at least some examples, the ROI may be a two-dimensional bounding box, a three-dimensional bounding box, a mask, or the like. In some examples, the ML model may additionally or alternatively output a confidence associated with the ROI identifying a probability that the ROI correctly identifies the object. For example, an ROI may include a box indicative of pixels identified as being associated with the detected object (a "bounding box"), a mask that includes pixels that correspond to the detected object, etc. The techniques may further comprise providing the second image to the ML model and receiving a second ROI associated with the object in the second image.

The techniques discussed herein may include an additional or alternative ML model, a segmentation model, that generates a segmentation of the sensor data that corresponds to an object. For example, the segmentation may comprise a mask and/or other identification of the discrete components of sensor data (e.g., pixels of an image, points of a LIDAR point cloud) that correspond to an object detected in sensor data. For example, where the sensor data comprises an image of pixels, the segmentation may identify a subset of the pixels as being associated with the object. In some examples, the segmentation model may receive an ROI from a first ML model and/or some other indication of an area of the image that may represent an object, and the segmentation model may output a segmentation (or otherwise a segment) that identifies the discrete portion of the image that represents the object. This may include generating a mask in association with a ROI that identifies pixels that are associated with an object and/or those pixels that are not associated with an object. In some instances, a segmentation may identify a portion of sensor data that is up to as much of the sensor data identified by an ROI. In an additional or alternate example, the segmentation may comprise a semantic label (e.g., "four-wheeled vehicle," "two-wheeled vehicle," "cyclist," "construction zone," "ground") and/or a semantic label for the segment and/or bounding box may be generated by a different ML model.

The techniques may include comparing a first segmentation generated for first sensor data and a second segmentation generated for second sensor data. Comparing the segmentations may comprise determining a first embedding for a first segmentation and a second embedding for a second segmentation using an additional ML model (an "embedding model"). The embedding model may map an ROI and/or a segmentation to a tensor, vector of an n-dimensional space, etc., represented in an embedding space (e.g., a data representation). The embedding model may be trained using segmentations (and ground truths corresponding thereto) and may be designed to cluster, in the n-dimensional space, segmentations that share similar implicit (learned) and/or explicit characteristics.

Additionally or alternatively to generating an embedding representing a segmentation (which may be an instance segmentation—a segmentation associated with a unique identification), the techniques discussed herein may comprise otherwise determining a representation of the segmentation, so that similarity of segmentations may be compared. For example, in addition or alternatively to determining an embedding representing a segmentation, the techniques may comprise determining a feature vector associated with the segmentation (e.g., using scale-invariant feature detection (SIFT), feature matching and indexing, cluster identification, a feature map output from an artificial neural network, etc.).

Comparing the segmentations may additionally or alternatively comprise determining a similarity between the first segmentation and the second segmentation. Determining the similarity may comprise calculating a distance between the first embedding and the second embedding in the n-dimensional space. In some examples, if the distance is less than a distance threshold, the techniques may comprise identifying the first segmentation and the second segmentation as corresponding to a same object and/or associating the segmentations and/or ROIs associated therewith with a track. If the distance is greater than the distance threshold, then the techniques may comprise searching for an object to which the first segmentation and/or the second segmentation is more likely to match and/or generating a new object track. In some examples, the track may comprise current and/or former position(s) of a representation of an object in an image, heading(s) of the object, velocity(ies) of the object, acceleration(s) of the object, a jitter associated with the object and/or the image, and/or current and/or previous ROI(s) associated with the object (which may include extents, classifications, center/centroids and uncertainties and/or covariances associated therewith).

Example Scenario

FIG. 1 illustrates an example scenario 100 including an autonomous vehicle 102. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. For example, the autonomous vehicle 102 may receive image(s) 106(1) to 106(M) (collectively "images 106"), where M is any integer greater than 1, from the sensor(s) 104. The discussion herein primarily discusses images, for ease, but it is contemplated that the techniques may be applied to any sensor data that has the capability to discretely represent an object (e.g., a point cloud including points that represent an object).

In some examples, the autonomous vehicle may include computing device(s) 108 that may include a perception engine 110 and/or a planner 112. The perception engine 110 may include one or more ML models and/or other computer-executable instructions for detecting, identifying, segmenting, classifying, and/or tracking objects from sensor data collected from the environment of the autonomous vehicle 102, such as ML model 114. In some instances, the perception engine 110 may receive sensor data from sensor(s) 104 of the autonomous vehicle 102, determine perception data from the sensor data, and transmit the perception data to a planner 112 for use by the planner 112 to localize a position of the autonomous vehicle 102 on a global map and/or a local map, determine one or more trajectories, and/or control motion of the autonomous vehicle 102 to traverse a path or route, though any such operation may be performed in various other components (e.g., localization may be performed by a localization engine, not shown). In some instances, the perception data may comprise an ROI and/or a track associated with an object detected in an image. The planner 112 may determine instructions for controlling operations of the autonomous vehicle 102 based at least in part on the ROI and/or the track.

For example, the perception engine 110 may detect an object in the environment and classify the object (e.g., "four-wheeled vehicle," "semi-truck," "pedestrian," "animal," "construction vehicle"). In the illustrated example, autonomous vehicle 102 may receive image(s) 106 comprising image 106(1), which includes a representation of a vehicle 116. The perception engine 110 may generate an ROI 118 based at least in part on detecting vehicle 116 as being represented in image 106(1). In the illustrated example, the ROI 118 is a bounding box, although other techniques for identifying the ROI are contemplated.

In some examples, the perception engine 110 may also determine a track 120 of an object, such as vehicle 116. In some examples, the track 120 may comprise a current, predicted, and/or historical position, heading, velocity, acceleration, distance, ROI(s), and/or center of the object. In some examples, any of these characteristics may be real world values (e.g., a velocity of the object in the real world in meters per second, kilometers per hour, a heading relative to the sensor that captured them image) and/or image-relative characteristics (e.g., a velocity associated with movement of a representation of the object across images in pixels per second, a heading that identifies an angle of movement of the representation of the object in the image). In some examples, a track may additionally or alternatively comprise an association between objects detected in two different images. The track may thereby be an indication that the perception engine 110 is identifying two object detections as corresponding to a same object. Of course, though depicted in FIG. 1 as track 120, such depiction is merely for illustrative purposes and the track information for an object may comprise any data structure and/or format.

The illustrated example depicts two previous centers of the object in the image, center 122 and center 124. For example, centers 122 and 124 may be associated with a previous two images taken before the current image, 106(1). Center 126 may be a center associated with the current image, image 106(1), and center 122 may correspond to an image when the vehicle 116 first came into the field of view of the camera (e.g., perhaps just the hood or some other front portion of the vehicle 116 appeared in an image taken by the camera). In some examples, a "center" of the object may be a center of an ROI associated with the object and/or a center that is otherwise calculated for the object (e.g., an estimation of the center of gravity of the object, a centroid of a segmentation (which may be an instance segmentation), etc.). It is contemplated that an additional or alternative point may be tracked other than the center. The illustrated example also shows velocity 128 and velocity 130. For example, velocity 130 may represent a distance the object moved (e.g., either within the image, in pixels for example, or in the real world, in meters for example) over a time between when image 106(1) was taken and when the image corresponding to center 124 was taken. In an additional or alternate example, velocity may be replaced by an indication of distance traversed by the object. Again, the distance may be a distance within the image or in the real world. For simplicity the illustrated example does not depict ROIs associated with centers 122, 124, and 126.

In some instances, the perception engine 110 may additionally or alternatively determine a position of the autonomous vehicle 102 determined by a localization engine (not pictured, which may use any sensor data to localize the autonomous vehicle 102), data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception engine 110 may be collectively referred to as "perception data." Once the perception engine 110 has identified and/or segmented objects from the image and/or determined other perception data, the perception may provide the perception data, including the object detections and/or instance segmentations, to a planner 112.

In some instances, the planner 112 may use perception data, including the ROIs, track, and/or segmentations (discussed further below) to generate instructions for controlling operation of the autonomous vehicle 102. For example, the planner 112 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second) and based at least in part on an ROI, track, and/or segmentation, to control the vehicle to traverse the route; and select one of the potential trajectories as a trajectory of the autonomous vehicle 102 that may be used to generate a drive control signal that may be transmitted to drive components of the autonomous vehicle 102.

Example ML Model Outputs

Figure 2A:
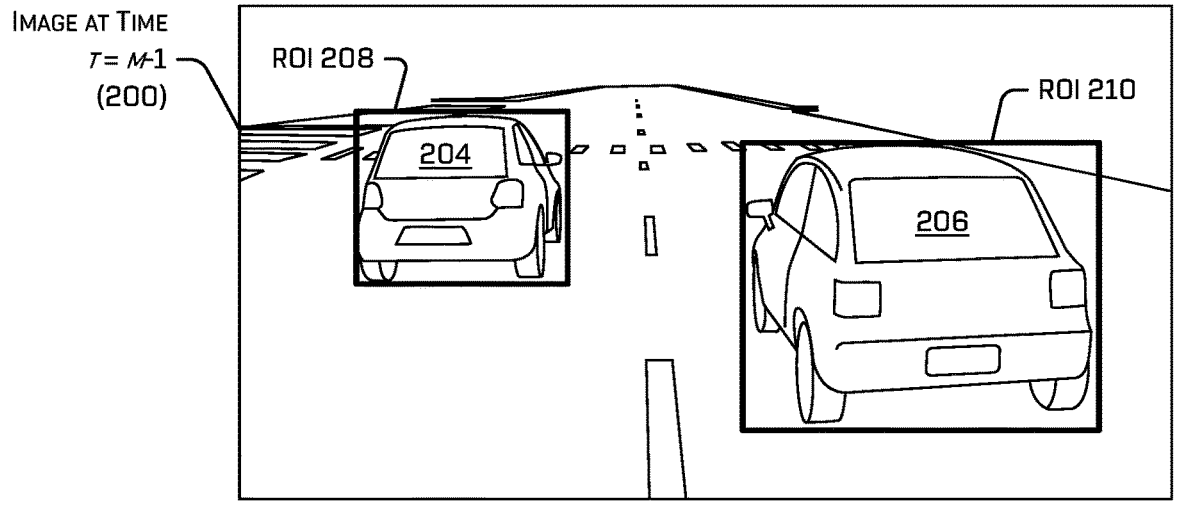
FIGS. 2A and 2B depict example images taken at different times and example regions of interest corresponding to objects detected in the example images.
Figure 2B:
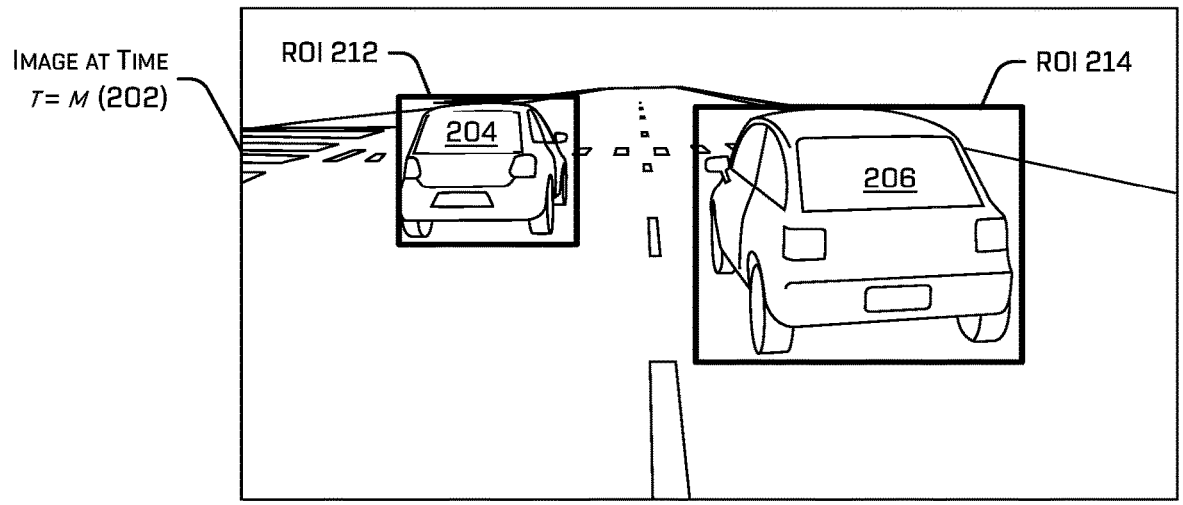

FIGS. 2A-2D illustrate additional details regarding inputs and outputs of ML model(s) of the perception engine. FIG. 2A depicts an image 200 taken at a time t=m−1 and FIG. 2B depicts an image 202 taken at time t=m. For simplicity the examples discussed herein discuss images, but it is understood that the techniques discussed herein may be applied to other types of sensor data (e.g., points of a LIDAR point cloud, RADAR data). Image 200 and image 202 may be consecutive or, in some examples, image 200 may have at least been captured at some time before (i.e., "prior to") image 202. Images 200 and 202 may both include representations of a vehicle 204 and a vehicle 206. A first ML model of the perception engine may, for each of the images, detect vehicle 204 and vehicle 206 and generate ROIs for the vehicles. For example, the first model may generate ROI 208 for vehicle 204 and ROI 210 for vehicle 206, as represented in image 200; and ROI 212 for vehicle 204 and ROI 214, as represented in image 202. In some instances, the first model may generate a confidence score in association with an ROI. A confidence score (and/or uncertainty score) may indicate a probability that the associated ROI accurately represents a region of the image that represents an object. Additionally or alternatively, the first model may determine a semantic label associated with the object. For example, the semantic label may indicate "four-wheeled vehicle," "cyclist," "pedestrian," "stoplight."

Figure 2C:
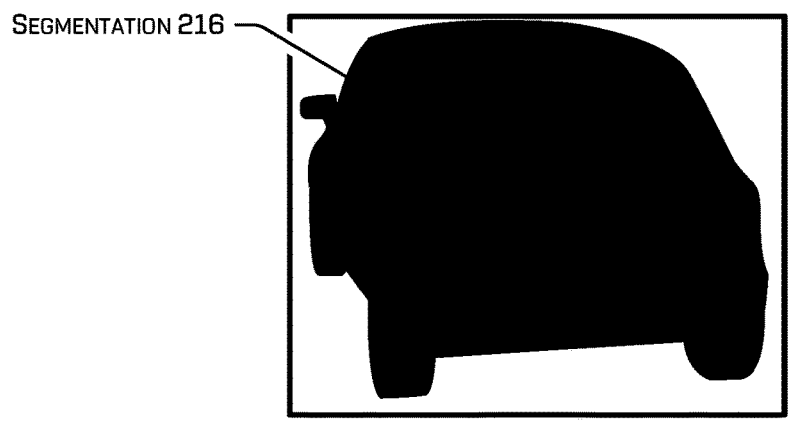
FIG. 2C illustrates an example segmentation of an object that appears in the example image depicted in FIG. 2A.

FIG. 2C illustrates an example segmentation 216 of vehicle 206 that a segmentation model may generate responsive to receiving image 200 and/or ROI 210. In the depicted illustration, segmentation 216 is an example of a mask, where the shaded region represents a positive indication that pixels (and/or other discrete portions of the sensor data) associated with the shaded region are associated with vehicle 206. In an additional or alternate example, the segmentation 216 may identify pixels (and/or other discrete portions of the sensor data) are not associated with the vehicle 206 (e.g., the unshaded space within ROI 210). It is contemplated that the segmentation 216 may comprise any other identification of the discrete portions of the sensor data that correspond with an object detected as being represented in the sensor data (e.g., points in a point cloud of lidar data, radar returns of radar data, and the like).

Figure 2D:
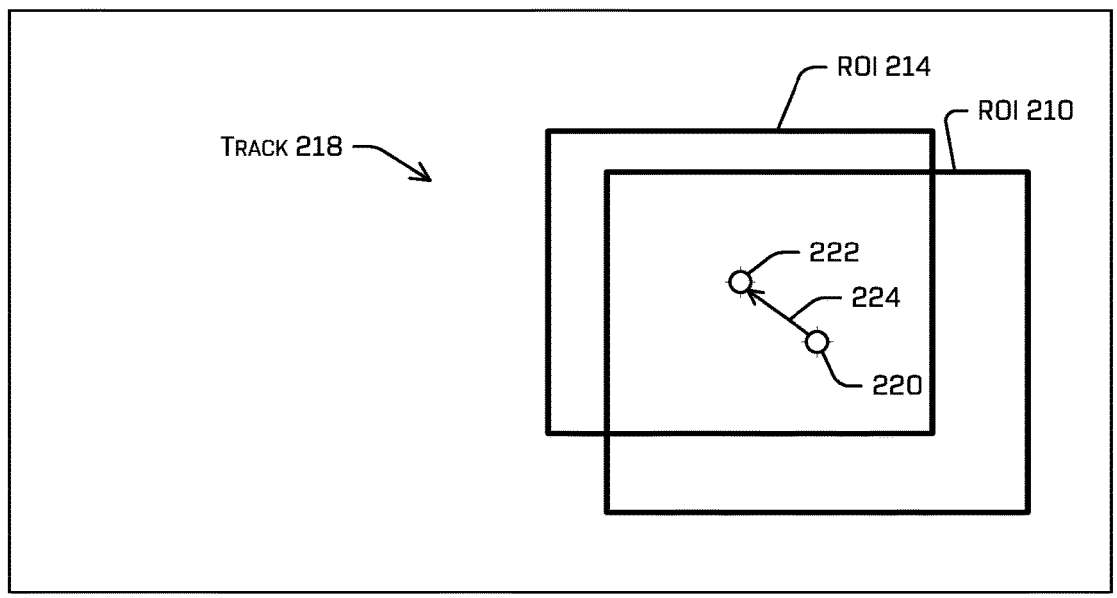
FIG. 2D illustrates a representation of an example track associated with an object detected as being present in two images.

FIG. 2D illustrates an example representation of a track 218 associated with vehicle 206. Track 218 may be generated based at least in part on determining a similarity between a first segmentation associated with ROI 210 and a second segmentation associated with ROI 214. If the similarity is sufficient (e.g., a distance between a first vector representation of the first segmentation and a second vector representation of the second segmentation is less than a distance threshold and/or the distance is the smallest distance between the first vector and any other vector associated with objects in the second image (e.g., the lowest of a plurality of vectors associated with segments in the second image)), then track 218 may be generated. Generating track 218 may comprise associating a detection notification, ROI, center, segmentation, etc. associated with vehicle 206 and image 202 with a detection notification, ROI, center (center, centroid, etc.), segmentation, etc. (which may include extents, classifications, center/centroids and uncertainties and/or covariances associated therewith) associated with vehicle 206 and image 200. For example, ROI 210 and ROI 214 may be associated and/or a center 220 (associated with ROI 210) and a center 222 (associated with ROI 214) may be associated.

Generating the track 218 may additionally or alternatively include determining characteristics associated with a transformation of a representation of the vehicle 206 between the two images such as, for example, a position, a distance, a velocity, an acceleration, a jerk, etc. For example, the depicted example of track 218 depicts an arrow 224, which may represent a velocity and/or a distance traversed of representations of the vehicle 206 between image 200 and image 202. As discussed above, the velocity and/or distance may be a real-world estimation and/or an image-relative measurement. For example, the arrow 224 may represent an estimated velocity of vehicle 206 in the real world, in miles per hour or kilometers per hour, and/or the arrow 224 may represent a measured number of pixels traversed by a center of the vehicle 206 over time between image 200 and image 202.

The track 218 generated for the image may be used to corroborate other sensor data, such as data from one or more sensors such as another image sensor, another type of image sensor, LIDAR, RADAR, GPS, compass, etc. In an additional or alternate example, data from one or more sensors and/or other models may augment the track 218. For example, generating the track 218 may comprise determining a heading of the vehicle 206 based at least in part on receiving a pose estimate associated with an image sensor that captured image 200 and/or image 202, compass data, GPS data, and/or an output from another model that estimates a pose of vehicle 206 based at least in part on a segmentation, ROI, and/or LIDAR point cloud associated with vehicle 206.

Example Architecture

Figure 3:
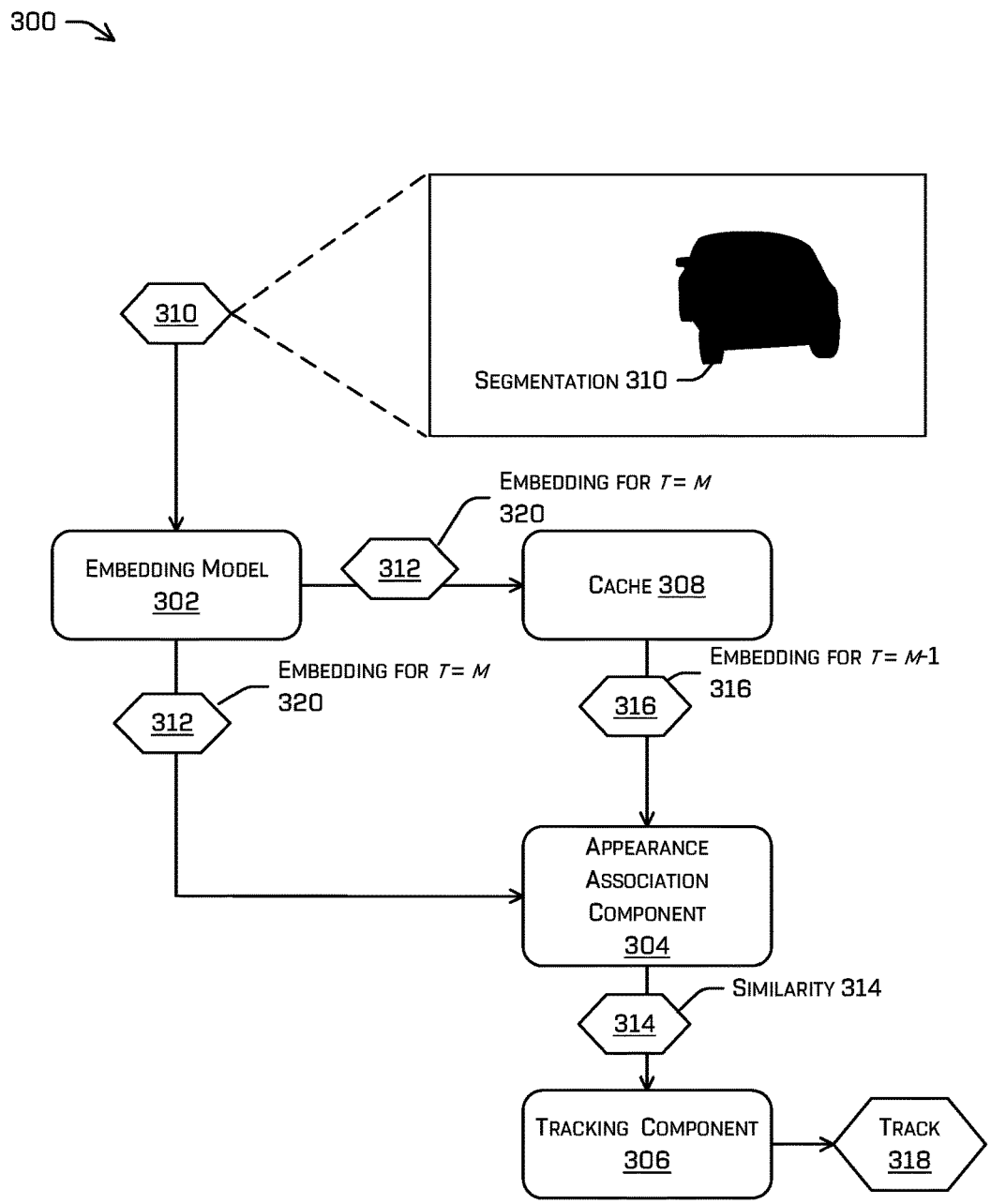
FIG. 3 illustrates a block diagram of an example architecture for detecting whether a same object is represented in two different images and/or generating a track for the object.

FIG. 3 depicts a block diagram of an example architecture 300 for detecting whether a first representation of an object in first sensor data corresponds to a same object represented in second sensor data (as a second representation) and/or generating a track for the object based at least in part on determining that the first representation and the second representation are associated with the same object. In some examples, example architecture 300 may represent a portion of a perception engine, such as perception engine 110.

In the depicted example, the example architecture 300 may comprise an embedding model 302, an appearance association component 304, and/or a tracking component 306. In some examples, the example architecture 300 may additionally or alternatively comprise a cache 308. In some examples, in addition to or instead of the cache 308, the example architecture 300 may comprise a first pipeline and a second pipeline, each comprising an embedding model, where the first pipeline receives a first segmentation and the second pipeline receives a second segmentation and/or, in an additional or alternate example, the architecture 300 may be trained to receive two segmentations as input. In some examples, the first image and the second image may have been captured by a same image sensor, but at different times, and/or the first sensor data and/or first segmentation corresponding thereto may have been captured by a first sensor and the second sensor data and/or second segmentation corresponding thereto may have been captured by a second sensor (for example where a vehicle having multiple sensors rotates relative to the object). In some examples, another component of the perception engine may generate an ROI and/or a segmentation for the sensor data. The depicted example is an example of a single pipeline, which may receive a first segmentation, process the first segmentation, store a result of processing the first image in the cache 308, receive a second image, process the second segmentation, and compare (at appearance association component 304) an output generated for the second segmentation to the output generated for the first segmentation that was stored in cache 308. In an additional or alternate example, the embedding model 302 may be trained to receive the first segmentation and the second segmentation substantially simultaneously (e.g., within technical tolerance) and generate outputs corresponding thereto substantially simultaneously.

In some examples, e.g. those models which comprise input of a single image at a time, the embedding model 302 may comprise a recurrent neural network. In such examples, the model may retain some information about previously input data to create associations between instances and/or segments. In some examples, such as, but not limited to, those examples where two segments are input simultaneously, embedding model 302 may not have any recurrent neural network layers.

In some instances, one or more of the component(s) discussed herein may be implemented in whole, or in part, as a neural network. As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine-learning, which may refer to a broad class of such algorithms in which an output is generated based on learned parameters.

Although discussed in the context of neural networks, any type of machine-learning may be used consistent with this disclosure. For example, machine-learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet50, ResNet101, VGG, DenseNet, PointNet, and the like.

In some examples, embedding model 302 may receive a segmentation 310 from another component. This other component may comprise an ML model, such as a neural network, and/or a component that conducts edge detection, graph partitioning, histogram cluster detection, etc., that outputs segmentation 310. In some instances, the segmentation 310 may comprise color-valued pixels, reduce color-valued pixels to grayscale, reference pixels of the image 202 (e.g., by a mask identifying a subset of pixels of the image 202 that correspond with the segmentation 310), and/or indicate a contour of the vehicle 206, as represented in image 202 (in an example where the sensor data comprises an image).

In some examples, the embedding model 302 may be trained to receive the segmentation 310 generate an embedding 312 based at least in part on (or otherwise associated with) the segmentation 310. For example, the embedding model 302 may be an ML model trained on segmentations and/or semantic labels to map the segmentations and/or semantic labels to an n-dimensional space, i.e., an embedding space. The number of dimensions, n, may be defined as a number of known characteristics of the image segmentations and/or may be arbitrarily chosen. In at least some examples, the embedding may not be linear, but any dimensional representation of such a segmentation in an higher- or lower-ordered embedding space. This may define an embedding space as a high-dimensional space, potentially in the hundreds or thousands of dimensions, depending on the amount of data indicated by the segmentation 310. In some examples, an embedding generated by the embedding model 302 may comprise a vector that comprises real values that collectively identify a point in the n-dimensional space (e.g., $(r_1, r_2, \ldots, r_n)$). In some examples, the embedding model 302 may comprise a number of input nodes that equals n, although it is contemplated that the embedding model 302 may comprise more or less input nodes.

The embedding model 302 may be trained on segmentations and/or semantic labels to map segmentations and/or semantic labels discriminatorily, meaning that the more different that a segmentation and/or semantic label is to another segmentation and/or semantic label, the further the respective points thereof generated by the embedding model will be in the n-dimensional space. For example, a first image segmentation of a profile of a passenger vehicle associated with a semantic label, "4-wheeled vehicle," may be mapped to a first point in the n-dimensional space, represented by a first embedding (vector), that is close to a second point in the n-dimensional space that was generated for a second image segmentation of a rear-view of a passenger vehicle associated with a semantic label, "4-wheeled vehicle." Whereas, the first point may be comparatively more distant from a third point generated for an image segmentation associated with a semantic label, "cyclist," and even more distant from a fourth point generated for an image segmentation associated with a semantic label, "ground."

Training embedding model 302 may comprise providing a plurality of training segmentations to the embedding model 302. For example the plurality of training segmentations may comprise a triplet of data comprising two segmentations that represent a same type of object (e.g., two vehicles) and a different type of object (e.g., a pedestrian) (e.g., the triplet comprises two same types of objects and one different type of object). It is understood that the plurality of training segmentations may otherwise comprise segmentations comprising representations of different types of objects. The embedding model 302 may be trained to generate embeddings that are near (e.g., within a threshold distance) to each other for similar segmentations (e.g., two segmentations that each include a vehicle) and an embedding that is farther away (e.g., beyond the threshold distance) that represents a different type of object and/or a different object. In some examples, training the embedding model 302 may comprise determining a loss based at least in part on a training embedding received additionally or alternatively to the training segmentations. Such losses may be generated, for example, based on triplet losses, L2 losses, and the like. For additional information, see U.S. patent application Ser. No. 16/147,328, filed Sep. 28, 2018, which is incorporated in its entirety herein.

Additionally to or instead of determining an embedding, the embedding model 302 may determine a representation of the segmentation 310 and/or other data related thereto by including other dimensionality reducing components such as, for example, a component configured to calculate a principal component analysis (PCA) (e.g., via Eigen decomposition and/or singular value decomposition (SVD)), a component configured to calculate a t-distributed stochastic neighbor embedding (t-SNE), and/or an autoencoder (e.g., structuring the embedding model to have input and output layers of the same dimension where an intermediate layer learns to encode data received via the input layers and to output code that matches or nearly matches the original data via the output layers, stochastic gradient variational Bayes (SGVB) algorithm, sparse autoencoder)).

In an example where the example architecture 300 comprises a single pipeline, the embedding model 302 may transmit the embedding 312 (which corresponds to the segmentation of image 202 captured at time t=m) to a cache 308 so that the embedding 312 may be retrieved to determine whether a subsequent image includes a representation of a same object as identified by segmentation 310/embedding 312. The embedding model 302 may additionally or alternatively transmit the embedding 312 to an appearance association component 304.

In some examples, the appearance association component 304 may determine a similarity 314 of a first segmentation, such as segmentation 310, to a prior segmentation, such as a segmentation generated in association with image 200 captured at time t=m−1 (316). In some examples, the appearance association component 304 may determine the similarity 314 based at least in part on comparing an embedding 312 associated with a current image/segmentation (e.g., image 202/segmentation 310) to an embedding 316 associated with a prior segmentation/image (e.g., image 200, unillustrated segmentation). In examples with two pipelines, the two pipelines may provide embedding 312 and embedding 316, respectively to the appearance association component 304. In an example with a single pipeline, such as the illustrated example architecture 300, the appearance association component 304 may retrieve the embeddings from cache 308 and/or the appearance association component 304 may receive an embedding 312 for a current image from the embedding model 302 and retrieve a prior embedding (e.g. embedding 316) from the cache 308. In some examples, comparing the embeddings (determining the similarity 314) may comprise calculating a distance, in the n-dimensional space, between embedding 312 and embedding 316. In additional or alternate examples, the appearance association component 304 may determine other metrics of similarity between segmentation 310 and a prior segmentation. For example, the appearance association component 304 may additionally or alternatively determine a degree of alignment of an ROI associated with the current image to an ROI associated with a prior image, transforming a contour of the segmentation 310 (e.g. by horizontally and/or vertically scaling, keystoning, projecting the segmentation 310 into a three-dimensional space and rotating and/or moving the projected segmentation about or along one or more axes of the three-dimensional space) achieves a contour of the prior segmentation, etc.

The appearance association component 304 may provide the similarity 314 to a tracking component 306. In some examples, if the similarity satisfies a threshold (e.g., the distance is below a distance threshold), the tracking component 306 may identify segmentation 310 and/or ROI 214 as being associated with a previously detected object. This may include associating at least one of the outputs of the pipeline (e.g., outputs embedding model 302) with previous output(s) of the pipeline, a prior image, and/or a track 318. The tracking component 306 may transmit the track 318 to other components of the perception engine and/or to a planner. In some examples, the tracking component 306 may additionally or alternatively update characteristics associated with the track 318 based at least in part on determining to associate the current output(s) of the pipeline with the track 318. For example, the tracking component 306 may update a current position, a velocity, an acceleration, a jitter, etc. associated with track 318.

In some examples, if the tracking component 306 determines that the similarity 314 does not satisfy the threshold (e.g., the distance exceeds the distance threshold), the tracking component 306 may generate a new track associated with segmentation 310 and/or the tracking component 306 may conduct a search for another ROI and/or segmentation that may indicate an object associated with segmentation 310. For example, the tracking component 306 may retrieve other ROIs generated for image 202 and determine whether another ROI overlaps at least part of an ROI associated with the current image and/or overlaps at least part of a prior ROI associated with a prior image. Upon identifying such an ROI, the tracking component 306 may cause the pipeline to generate a segmentation, semantic label, embedding, and/or similarity associated with that ROI and the ROI with which that ROI overlaps.

Example Process

Figure 4:
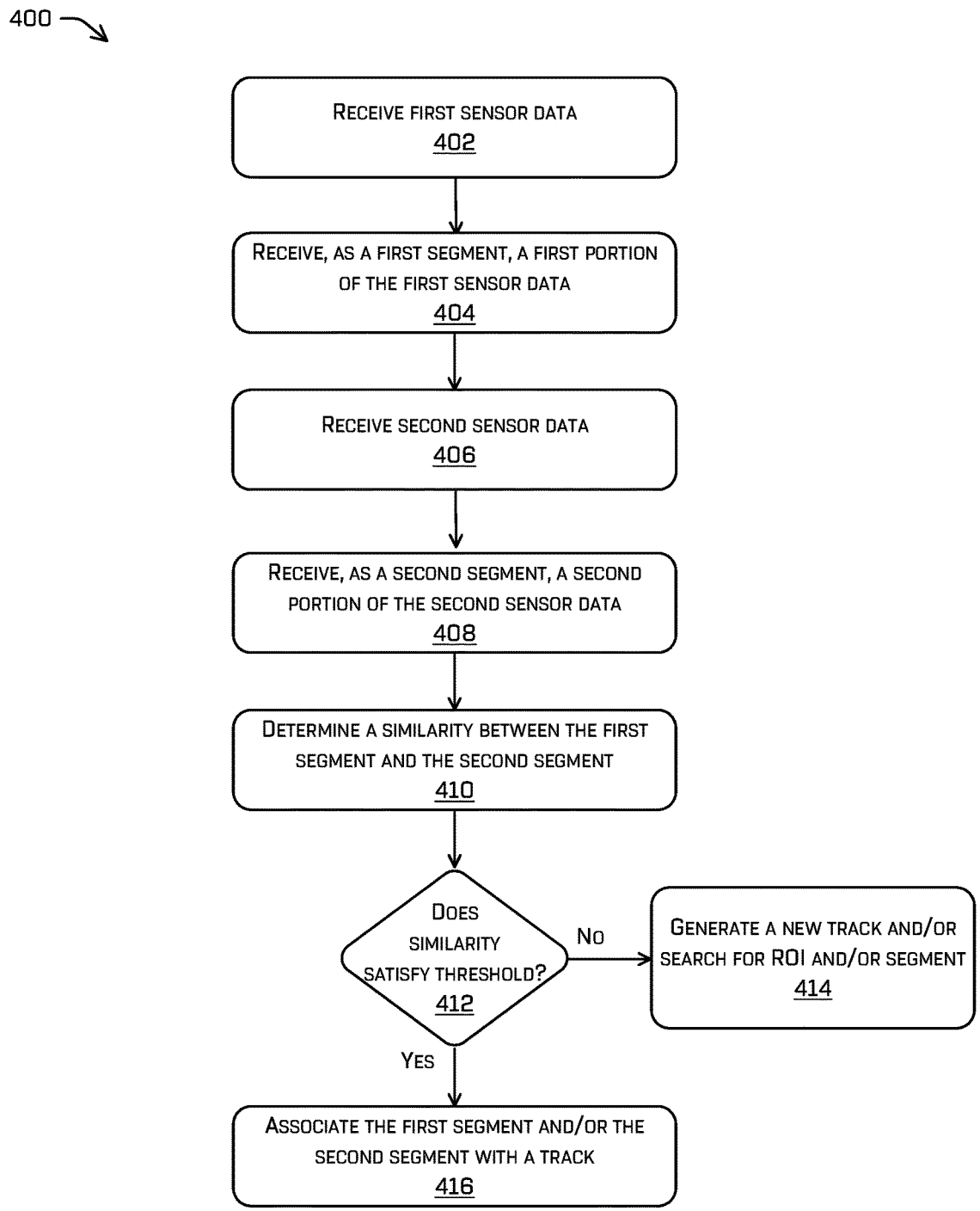
FIG. 4 illustrates a flow diagram of an example process for determining whether a first image and a second image both include a representation of a same object and/or tracking the object.

FIG. 4 illustrates an example process 400 for determining whether first sensor data and second sensor data both include a representation of a same object and/or tracking an object, as it is represented in first sensor data and second sensor data. In some examples, example process 400 may be accomplished by component(s) of example architecture 300.

At operation 402, example process 400 may comprise receiving first sensor data, according to any of the techniques discussed herein. In some examples, the first sensor data may include a first image captured by an image sensor at a first time, a first point cloud of LIDAR points, etc. The first sensor data may comprise an image such as, for example, a grayscale image, a red-green-blue (RGB) image, a time of flight image, a depth image, an infrared image, an image of LIDAR points (and/or other three or more dimensional sensor data points) projected into a two-dimensional space, a LIDAR point cloud, RADAR points, and/or any combination thereof. It is understood that operation 402 may additionally or alternatively comprise receiving other types of sensor data from one or more sensors (e.g., a LIDAR point cloud form a LIDAR sensor).

At operation 404, example process 400 may additionally or alternatively comprise receiving, as a first segment, a first portion of the first sensor data, according to any of the techniques discussed herein. For example, a segmentation model may receive the first sensor data and output a segmentation and/or an ROI based at least in part on the first sensor data. The ROI may identify a subset of the first sensor data and the segmentation may identify a further subset of the ROI as being associated with the object (and/or inversely identifying a subset of the first sensor data and/or ROI as not being associated with the object, in an example where the first sensor data). In at least some examples, such a segmentation may be determined without the ROI. In such examples, the first sensor data may be input directly into a segmentation model, an output of which may comprise the segmentation. In various examples, the segmentation may identify particular pixels, particular LIDAR points, particular RADAR readings, etc. associated with the object.

At operation 406, example process 400 may comprise receiving second sensor data, according to any of the techniques discussed herein. In some examples, the second sensor data may be received from a same sensor that captured the first sensor data. In additional or alternate examples, the second sensor data may be received from a different sensor. In some examples, the second sensor data may be captured at a second time, wherein the second time follows the first time or is prior to the first time. In some examples, the second sensor data may include a second image, a second point cloud of LIDAR points, etc.

At operation 408, example process 400 may comprise receiving, as a second segment, a second portion of the second sensor data, according to any of the techniques discussed herein.

At operation 410, example process 400 may comprise determining a similarity between the first segment and the second segment, according to any of the techniques discussed herein. For example, determining the similarity may comprise determining representations of the first segment and the second segment (e.g., a first embedding associated with the first segment and a second embedding associated with the second segment) and determining a distance between the first segment and the second segment (e.g., a distance in an embedding space between a first embedding and a second embedding). For example, the distance may be a Euclidean distance, although it is understood the distance may comprise additional or alternative distance(s).

At operation 412, example process 400 may comprise determining whether the similarity satisfies a threshold, according to any of the techniques discussed herein. For example, operation 412 may comprise determining whether the distance calculated at operation 410 meets or is less than a distance threshold. In some examples, the distance threshold may be set based at least in part on a number of dimensions of an embedding space and/or maximum values associated with the embedding space. In some examples, an embedding generated by the embedding model may be normalized so that the distance threshold may be more easily determined. The network for generating an embedding may be trained such that a distance should be set such that points generated for similar objects should be recognized as being associated with a same object while not being able to be conflated as being associated with an object of a different type and/or characteristic. This may comprise configuring the training to drive embeddings generated for similar objects to be within a first distance, but for embeddings for different objects to be the distance threshold away from dissimilar objects.

At operation 414, example process 400 may comprise generating a new track and/or searching for an ROI and/or segment that does satisfy the threshold, based at least in part on determining that the similarity does not satisfy the threshold, according to any of the techniques discussed herein. In some examples, upon determining that the similarity does not satisfy the threshold, operation 416 may additionally or alternatively generate a notification that the similarity does not satisfy the threshold. In some examples, a tracking component may cause the perception engine to re-evaluate sensor data and/or to use a different pipeline (e.g., using differently trained ML models and/or different components) to evaluate the sensor data in an attempt to find an object that was associated with a track. Re-evaluating the sensor data may comprise re-detecting object(s) in the sensor data and/or in an ROI and/or re-generating an ROI, segment, and/or semantic label. In some examples, the tracking component may provide a current and/or previous sensor data, ROI, segment, and/or semantic label to an ML model and receive from the ML model a probability that a previously-tracked object is currently occluded by another object. Additionally or alternatively, operation 414 may comprise discarding at least one of the first segment, the second segment, or a track associated with an object. In some examples, operation 414 may create a new track for a new object.

At operation 416, example process 400 may comprise associating the first segment and/or the second segment with a track, according to any of the techniques discussed herein. Associating the first segment with the second segment may be part of generating a track, at least in part, since such an association may indicate that the first segment and the second segment identify a same object. In some examples, upon determining that the similarity does satisfy the threshold, operation 416 may additionally or alternatively comprise associating output(s) of a pipeline of the perception engine with a track and/or determining and/or updating characteristics associated with the track.

Note that, although the example process 400 is depicted as sequential operations, it is understood that the operations discussed herein may be performed in a different order, simultaneously, and/or by one or more devices.

Example System

Figure 5:
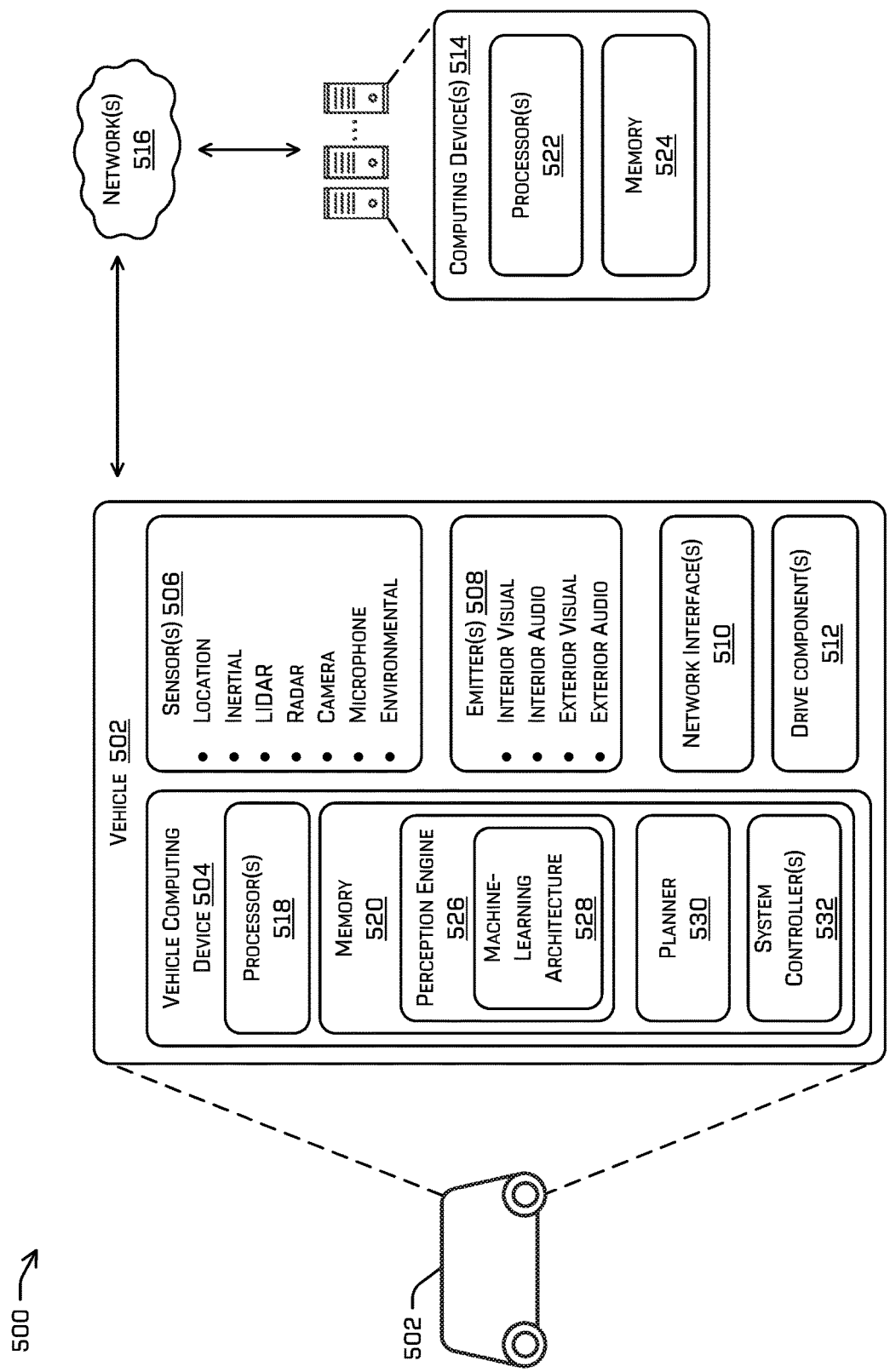
FIG. 5 illustrates a block diagram of an example system for determining whether a first image and a second image both include a representation of a same object and/or tracking the object.

FIG. 5 illustrates a block diagram of an example system that implements the techniques discussed herein. In some instances, the system 500 may include a vehicle 502, which may correspond to the autonomous vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well.

The vehicle 502 may include a vehicle computing device 504, one or more sensor(s) 506, one or more emitters 508, one or more network interfaces 510, at least one and/or one or more drive components 512.

In some instances, the sensor(s) 506 may include LIDAR sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., temperature sensors, humidity sensors, light sensors, pressure sensors, etc.), etc. The sensor(s) 506 may include multiple instances of each of these or other types of sensors. For instance, the LIDAR sensors may include individual LIDAR sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device 504.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive component(s) 512. Also, the network interface (s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with a computing device(s) 514. In some examples, computing device(s) 514 may comprise one or more nodes of a distributed computing system (e.g., a cloud computing architecture).

The network interface(s) 510 may include physical and/or logical interfaces for connecting the vehicle computing device 504 to another computing device or a network, such as network(s) 516. For example, the network interface(s) 510 may enable Wi-Fi-based communication such as via frequencies defined by the IEEE 500.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 504 and/or the sensor(s) 506 may send sensor data, via the network(s) 516, to the computing device(s) 514 at a particular frequency, after a lapse of a predetermined period of time, in near real-time, etc.

In some instances, the vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, LIDAR sensors, RADAR sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device 504 may include one or more processors 518 and memory 520 communicatively coupled with the one or more processors 518. Computing device(s) 514 may also include processor(s) 522, and/or memory 524. The processor(s) 518 and/or 522 may be any suitable processor capable of executing instructions to process data and perform operations as described herein. By way of example and not limitation, the processor(s) 518 and/or 522 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 520 and/or 524 may be examples of non-transitory computer-readable media. The memory 520 and/or 524 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 520 and/or memory 524 may store a perception engine 526, which may comprise a machine-learning architecture 528, a planner 530, and/or system controller(s) 532. Perception engine 526 may represent perception engine 110, machine-learning architecture 528 may include and/or represent machine-learning model 114 and/or example architecture 300, planner 530 may represent planner 112. In some instances, perception engine 526 may comprise a primary perception system, a secondary perception system, a prediction system, and/or a localization system. The memory 520 and/or 524 may additionally or alternatively store a mapping system, a planning system, a ride management system, etc. Although perception engine 526 and machine-learning architecture 528 are illustrated as being stored in memory 520 (and/or 524), perception engine 526 and/or machine-learning architecture 528 may include processor-executable instructions, machine-learned model(s) (e.g., a neural network), and/or hardware.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet60, ResNet101, VGG, DenseNet, PointNet, and the like.

Memory 520 may additionally or alternatively store one or more system controller(s) 532, which may be configured to control steering, propulsion, braking, safety, emitters, communication, and other systems of the vehicle 502. These system controller(s) 532 may communicate with and/or control corresponding systems of the drive component(s) 512 and/or other components of the vehicle 502. For example, the planner 530 may generate instructions based at least in part on a track and/or notifications generated by the perception engine 526 and transmit the instructions to the system controller(s) 532, which may control operation of the vehicle 502 based at least in part on the instructions. In some examples, if the planner 530 receives a notification that a track of an object was "lost" (e.g., an object no longer appears in sensor data that does appear in LIDAR and isn't occluded by any other objects), the planner 530 may generate an instruction to bring the vehicle 502 to a safe stop and/or to transmit a request for teleoperator assistance.

It should be noted that while FIG. 5 is illustrated as a distributed system, in alternative examples, components of the vehicle 502 may be associated with the computing device(s) 514 and/or components of the computing device(s) 514 may be associated with the vehicle 502. That is, the vehicle 502 may perform one or more of the functions associated with the computing device(s) 514, and vice versa.

EXAMPLE CLAUSES

A. A method comprising: receiving, from one or more sensors, a first image comprising a representation of an object; receiving, as a first segmentation, a first portion of the first image associated with the object; inputting, into a machine learned model, the first segmentation, the machine learned model being trained to output embeddings associated with an input segmentation; receiving, from the machine learned model, a first embedding associated with the first segmentation; receiving, from the one or more sensors, a second image; receiving, as a second segmentation, a second portion of the second image associated with the object; inputting, into the machine learned model, the second segmentation; receiving, from the machine learned model, a second embedding associated with the second segmentation; determining a similarity between the first segmentation and the second segmentation; based at least in part on the similarity, associating at least one of the first segmentation or the second segmentation with a track of the object; and controlling an autonomous vehicle based at least in part on the track.

B. The method of paragraph A, wherein the first segmentation indicates fewer pixels than a region of interest associated with the object and the first image.

C. The method of either paragraph A or B, wherein the machine learned model is trained, based at least in part on: providing a first training segmentation to the machine learned model; receiving, from the machine learned model, a first training embedding; providing a second training segmentation to the machine learned model; receiving, from the machine learned model, a second training embedding; determining, based at least in part on the first training embedding and the second training embedding, a loss; and altering one or more parameters associated with the machine learned model to minimize the loss.

D. The method of any one of paragraphs A-C, wherein: the similarity comprises a distance between the first embedding and the second embedding; and associating at least one of the first segmentation or the second segmentation with the track is based at least in part on determining that the distance is a lowest distance of a plurality of distances associated with one or more other segmentations.

E. The method of any one of paragraphs A-D, wherein: the similarity comprises a distance between the first embedding and the second embedding; and associating at least one of the first segment or the second segment with the track is based at least in part on determining that the distance is less than or equal to a distance threshold.

F. A system comprising: one or more sensors; one or more processors; and a memory storing processor-executable instructions that, when executed by the one or more processors, cause the system to perform operations comprising: receiving, from the one or more sensors, first sensor data; inputting, into a machine learned model, a first portion of the first sensor data associated with an object, wherein the first portion includes up to an entirety of the first sensor data; receiving, from the machine learned model, a first subset of data associated with the object and a first n-dimensional representation associated with the first subset of data; receiving, from the one or more sensors, second sensor data; inputting, into the machine learned model, a second portion of the second sensor data associated with the object, wherein the first second includes up to an entirety of the second sensor data; receiving, from the machine learned model, a second subset of data associated with the object and a second n-dimensional representation associated with the second subset of data; determining a similarity between the first subset of data and the second subset of data; and based at least in part on the similarity, associating at least one of the first subset of data or the second subset of data with a track of the object.

G. The system of paragraph F, wherein: the first subset of data comprises a first segment and the second subset of data comprises a second subset of data, and the machine learned model is trained based at least in part on: providing a first training segmentation to the machine learned model; receiving, from the machine learned model, a first training embedding; providing a second training segmentation to the machine learned model; receiving, from the machine learned model, a second training embedding; determining, based at least in part on the first training embedding and the second training embedding, a loss; and altering one or more parameters associated with the machine learned model to minimize the loss.

H. The system of either paragraph F or G, wherein the machine learned model is a neural network, wherein the first n-dimensional representation includes a first embedding, wherein n is an integer greater than two, and wherein the second n-dimensional representation includes a second embedding.

I. The system of any one of paragraphs F-H, wherein the machine learned model is a first machine learned model, and wherein the operations further comprise: inputting the first sensor data into a second machine learned model; receiving, from the machine learned model, a first region of interest comprising the first portion of sensor data; inputting the second sensor data into the second machine learned model; and receiving, from the second machine learned model, a second region of interest comprising the first portion of sensor data, and wherein: the first subset of data corresponds to a subset of the first region of interest, and the second subset of data corresponds to a subset of the second region of interest.

J. The system of any one of paragraphs F-I, wherein: the similarity comprises a distance, in an embedding space, between the first embedding and the second embedding; and associating at least one of the first portion or the second portion with the track is based at least in part on determining that the distance is less than or equal to a threshold distance.

K. The system of any one of paragraphs F-J, wherein the sensor data comprises one or more of: image data, lidar data, RADAR data.

L. The system of any one of paragraphs F-K, wherein the operations further comprise determining the track based at least in part on the first portion and the second portion and wherein the track comprises at least one of: a current position of at least part of a representation of the object in the image; one or more prior positions a representation of the object in the image; a heading of the object; a velocity of the object; an acceleration of the object; a jerk of the object; or an uncertainty associated with the object.

M. A non-transitory computer-readable medium storing processor-executable instructions that, when executed by one or more processors, cause the one or more processors to perform operations comprising: receiving first sensor data; receiving a first subset of the first sensor data representing an object in an environment; determining a first data representation associated with the first subset; receiving second sensor data; receiving a second subset of the second sensor data; determining a second data representation associated with the second subset; determining a similarity between the first subset and the second subset; and based at least in part on the similarity, associating at least one of the first subset or the second subset with a track of the object.

N. The non-transitory computer-readable medium of paragraph M, wherein determining the first data representation comprises: inputting, into a neural network, the first subset; and receiving, from the neural network, the first data representation, and wherein determining the second data representation comprises: inputting, into the neural network, the second subset; and receiving, from the neural network, the second data representation.

O. The non-transitory computer-readable medium of either of paragraphs M or N, wherein the neural network is trained, based at least in part, on: providing a first training segmentation to the neural network; receiving, from the neural network, a first training embedding; providing a second training segmentation to the neural network; receiving, from the neural network, a second training embedding; determining, based at least in part on the first training embedding and the second training embedding, a loss; and altering one or more parameters associated with the neural network to minimize the loss.

P. The non-transitory computer-readable medium of any one of paragraphs M-O, wherein: the neural network is a first neural network, and the operations further comprise: inputting the first sensor data into a second neural network; receiving, from the second neural network, the first subset; inputting the second sensor data into the second neural network; and receiving, from the second neural network, the second subset.

Q. The non-transitory computer-readable medium of any one of paragraphs M-P, wherein: the similarity comprises a Euclidian distance between the first data representation and the second data representation; and associating at least one of the first portion or the second portion with the track is based at least in part on determining that the distance is less than or equal to a threshold distance.

R. The non-transitory computer-readable medium of any one of paragraphs M-Q, wherein the first sensor data comprises first image data, the first subset comprises a first image segment, the second sensor data comprises second image data, and the second subset comprises a second image segment.

S. The non-transitory computer-readable medium of any one of paragraphs M-R, wherein at least one of the first data representation comprises an embedding associated with a segmentation of the first sensor data, the operations further comprising: controlling, based at least in part on the track, a vehicle.

T. The non-transitory computer-readable medium of any one of paragraphs M-S, wherein the instructions further cause the one or more processors to determine, based at least in part on the first portion and the second portion, the track, wherein the track comprises at least one of: a current position of at least part of a representation of the object in the image; one or more prior positions a representation of the object in the image; a heading of the object; a velocity of the object; an acceleration of the object a jerk of the object; or an uncertainty associated with the object.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving first sensor data comprising a representation of an object, wherein the first sensor data is associated with a first sensor type;
receiving a first sensor data segmentation of the first sensor data associated with the object;
inputting, into a machine learned model, the first sensor data segmentation and a semantic label associated with the first sensor data segmentation, the machine learned model being trained to output multi-dimensional vectors associated with image data;
receiving, from the machine learned model, a first multi-dimensional vector associated with the first sensor data segmentation and the semantic label;
receiving second sensor data, wherein the second sensor data is associated with a second sensor type;
receiving a second sensor data segmentation of the second sensor data associated with the object;
inputting, into the machine learned model, the second sensor data segmentation;
receiving, from the machine learned model, a second multi-dimensional vector associated with the second sensor data segmentation;
determining, based at least in part on the first multi-dimensional vector and the second multi-dimensional vector, a degree of similarity between the first sensor data segmentation and the second sensor data segmentation; and
controlling an autonomous vehicle based at least in part on the degree of similarity.

2. The method of claim 1, wherein the machine learned model is a first machine learned model and wherein the method further comprises:
determining the first sensor data segmentation by a second machine learned model based at least in part on the first sensor data; and determining the second sensor data segmentation by the second machine learned model based at least in part on the second sensor data.

3. The method of claim 1, further comprising associating, based at least in part on the similarity, at least one of the first sensor data segmentation or the second sensor data segmentation with the object.

4. The method of claim 1, wherein determining the degree of similarity comprises at least one of comparing or determining a distance between the first multi-dimensional vector and the second multi-dimensional vector.

5. The method of claim 1, wherein the first multi-dimensional vector is an embedding.

6. A device comprising:
one or more processors; and
a memory storing processor-executable instructions that, when executed by the one or more processors, cause the device to perform operations comprising:
receiving first sensor data associated with a first sensor modality;
inputting, into a machine learned model, a first portion of the first sensor data;
receiving, from the machine learned model, a first multi-dimensional vector associated with the first portion;
receiving second sensor data associated with a second sensor modality, wherein:
the first sensor data is associated with a first sensor type,
the second sensor data is associated with a second sensor type, and
the second sensor modality is a different modality than the first sensor modality;
inputting, into the machine learned model, a second portion of the second sensor data;
receiving, from the machine learned model, a second multi-dimensional vector associated with the second portion;
determining, based at least in part on the first multi-dimensional vector and the second multi-dimensional vector, a degree of similarity between the first portion and the second portion; and
controlling an autonomous vehicle based at least in part on the degree of similarity.

7. The device of claim 6, wherein the operations further comprise receiving, from the machine learned model, a first subset of data associated with an object, wherein the first subset of data includes a region of interest associated with the object in the first sensor data.

8. The device of claim 6, wherein the operations further comprise:
determining, by a second machine learned model and based at least in part on the first sensor data, a confidence that the first portion of the first sensor data is associated with an object; and
determining, by the second machine learned model and based at least in part on the second sensor data, a confidence that the second portion of the second sensor data is associated with the object.

9. The device of claim 6, wherein the machine learned model is a first machine learned model and wherein the operations further comprise:
determining the first portion by a second machine learned model based at least in part on the first sensor data, wherein the first portion is a first segmentation of the first sensor data; and determining the second portion by the second machine learned model based at least in part on the second sensor data, wherein the second portion is a second segmentation of the second sensor data.

10. The device of claim 9, wherein determining the degree of similarity comprises at least one of comparing or determining a distance between the first multi-dimensional vector and the second multi-dimensional vector.

11. The device of claim 6, wherein the operations further comprise associating, based at least in part on the degree of similarity, the first portion with the second portion and an object represented in at least one of the first sensor data or the second sensor data.

12. The device of claim 6, wherein:
the operations further comprise associating, based at least in part on the degree of similarity, the first portion and the second portion with a track; and
the track comprises at least one of: a current position of at least part of a representation of an object in the first sensor data or the second sensor data; one or more prior positions a representation of the object in previous sensor data; a heading of the object; a velocity of the object; an acceleration of the object; a jerk of the object; or an uncertainty associated with the object.

13. The device of claim 12, wherein controlling the autonomous vehicle is further based at least in part on the track.

14. A non-transitory computer-readable medium storing processor-executable instructions that, when executed by one or more processors, cause the one or more processors to perform operations comprising:
receiving first sensor data associated with a first sensor type;
inputting, into a machine learned model, a first sensor data segmentation of the first sensor data and a semantic label associated with the first sensor data segmentation, the first sensor data segmentation comprising a sensor data segmentation of the first sensor data;
receiving, from the machine learned model, a first multi-dimensional vector associated with the first sensor data segmentation and the semantic label;
receiving second sensor data associated with a second sensor type;
inputting, into the machine learned model, a second sensor data segmentation of the second sensor data;
receiving, from the machine learned model, a second multi-dimensional vector associated with the second sensor data segmentation; determining, based at least in part on the first multi-dimensional vector and the second multi-dimensional vector, a degree of similarity between the first sensor data segmentation and the second sensor data segmentation; and
controlling an autonomous vehicle based at least in part on the degree of similarity.

15. The non-transitory computer-readable medium of claim 14, wherein the operations further comprise receiving, from the machine learned model, a first subset of data associated with an object, wherein the first subset of data includes a region of interest associated with the object in the first sensor data.

16. The non-transitory computer-readable medium of claim 14, wherein the operations further comprise:
determining, by a second machine learned model and based at least in part on the first sensor data, a confidence that the first sensor data segmentation of the first sensor data is associated with an object; and
determining, by the second machine learned model and based at least in part on the second sensor data, a confidence that the second sensor data segmentation of the second sensor data is associated with the object.

17. The non-transitory computer-readable medium of claim 14, wherein the machine learned model is a first machine learned model and wherein the operations further comprise:
determining the first sensor data segmentation by a second machine learned model based at least in part on the first sensor data; and
determining the second sensor data segmentation by the second machine learned model based at least in part on the second sensor data.

18. The non-transitory computer-readable medium of claim 17, wherein determining the degree of similarity comprises at least one of comparing or determining a distance between the first multi-dimensional vector and the second multi-dimensional vector.

19. The non-transitory computer-readable medium of claim 14, wherein the operations further comprise associating, based at least in part on the degree of similarity, the first sensor data segmentation with the second sensor data segmentation and an object represented in at least one of the first sensor data or the second sensor data.

20. The non-transitory computer-readable medium of claim 14, wherein:
the operations further comprise associating, based at least in part on the degree of similarity, the first sensor data segmentation and the second sensor data segmentation with a track; and
the track comprises at least one of: a current position of at least part of a representation of an object in the first sensor data or the second sensor data; one or more prior positions a representation of the object in previous sensor data; a heading of the object; a velocity of the object; an acceleration of the object; a jerk of the object; or an uncertainty associated with the object.

* * * * *